United States Patent
Cai et al.

(10) Patent No.: US 7,912,908 B2
(45) Date of Patent: Mar. 22, 2011

(54) ELECTRONIC MESSAGE FORWARDING CONTROL

(75) Inventors: Yigang Cai, Naperville, IL (US); Alok Sharma, Lisle, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 694 days.

(21) Appl. No.: 11/389,741

(22) Filed: Mar. 27, 2006

(65) Prior Publication Data

US 2007/0226367 A1    Sep. 27, 2007

(51) Int. Cl.
*G06F 15/16* (2006.01)
*G06F 15/173* (2006.01)

(52) U.S. Cl. ......... 709/206; 709/224; 709/225; 370/354

(58) Field of Classification Search .......... 709/203, 709/206, 226, 228, 224, 229; 713/170; 726/1
See application file for complete search history.

(56) References Cited

U.S. PATENT DOCUMENTS

| | | | | |
|---|---|---|---|---|
| 6,035,327 | A * | 3/2000 | Buckley et al. | 709/206 |
| 6,747,970 | B1 * | 6/2004 | Lamb et al. | 370/352 |
| 6,772,196 | B1 * | 8/2004 | Kirsch et al. | 709/206 |
| 7,013,289 | B2 * | 3/2006 | Horn et al. | 705/26 |
| 7,234,059 | B1 * | 6/2007 | Beaver et al. | 713/170 |
| 7,411,939 | B1 * | 8/2008 | Lamb et al. | 370/352 |
| 7,502,828 | B2 * | 3/2009 | Gardner | 709/206 |
| 2002/0073159 | A1 * | 6/2002 | Jain | 709/206 |
| 2004/0078334 | A1 * | 4/2004 | Malcolm et al. | 705/50 |
| 2005/0091318 | A1 * | 4/2005 | Keohane et al. | 709/206 |
| 2007/0106738 | A1 * | 5/2007 | Barnes et al. | 709/206 |
| 2008/0172717 | A1 * | 7/2008 | Malcolm | 726/1 |

FOREIGN PATENT DOCUMENTS

| | | |
|---|---|---|
| CN | 1829336 | 9/2006 |
| DE | 10143496 | 3/2003 |
| EP | 1104964 | 6/2001 |

* cited by examiner

*Primary Examiner* — Khanh Q Dinh
(74) *Attorney, Agent, or Firm* — Duft, Bornsen & Fishman, LLP

(57) ABSTRACT

Systems and methods are disclosed that control whether a recipient of an electronic message (e.g., text messages, multimedia messages, email messages, etc) is allowed to forward the electronic message to third parties. When an electronic message is created or selected for transmission to a recipient, a forwarding control indicator is included in the electronic message. The forwarding control indicator indicates whether this electronic message is allowed to be forwarded by the recipient. If the recipient of the electronic message subsequently attempts to forward the electronic message, then the forwarding control indicator is processed to determine if the electronic message is allowed to be forwarded. If a determination is made that the electronic message is not allowed to be forwarded to the third party, then the electronic message is prevented from being forwarded to the third party. If a determination is made that the electronic message is allowed to be forwarded to the third party, then the electronic message is allowed to be forwarded to the third party.

17 Claims, 5 Drawing Sheets

ELECTRONIC MESSAGE FORWARDING CONTROL

BACKGROUND OF THE INVENTION

1. Field of the Invention

The invention is related to the field of communication networks and, in particular, to providing systems and methods that control whether a recipient of an electronic message is allowed to forward the electronic message to a third party.

2. Statement of the Problem

Wireless service providers typically offer text messaging services, such as Short Message Service (SMS), to their subscribers. SMS is a service available to digital mobile phones that allows for transmitting and receiving short text messages. Many service providers also offer multimedia messaging services, such as Multimedia Messaging Service (MMS), that allow for transmitting and receiving not only text but also various kinds of multimedia content, such as images, audio clips, video clips, etc.

To send an SMS message, a subscriber first enters the text into a mobile phone or other text-enabled device. The subscriber then enters one or more phone numbers for the recipients of the SMS message, and sends the SMS message. A Short Message Service Center (SMSC) receives and stores the SMS message. The SMSC then attempts to forward the SMS message to the recipient when the recipient is available.

Subscribers may also send SMS messages from a web site (often the web site of the service provider) providing SMS functionality. The subscriber enters the number of the recipient and creates customized text for the SMS message through the web site. The subscriber then clicks on "Send" or a similar button to send the SMS message to the recipient.

In addition to the customized text messages that a subscriber may create, there are many professional and non-professional message creators that generate specialized SMS messages. The specialized SMS messages may be a poem, a quote, a joke, a holiday message, etc. Specialized SMS messages such as this are often posted for sale on a content server such as through a web site. If a subscriber enters the web site of the content server having the specialized text messages, then the subscriber may purchase a specialized SMS message and send the specialized SMS message to one or more recipients through the web site. The message creator and the content provider (the owner of the content server) often share the profit of the purchase of the specialized SMS message.

Similar web sites exist that post specialized MMS messages for sale.

One problem with SMS messaging services and MMS messaging services is that recipients of SMS messages or MMS messages may forward the messages to third parties without limitation. A subscriber may create a customized SMS message that he/she only wants the intended recipient to receive, such as a message that is private or personal. Presently, the intended recipient can forward the SMS message to multiple third parties against the wishes of the subscriber. Also, a subscriber may purchase a specialized SMS message and send the specialized SMS message to a recipient. Presently, the recipient may forward the specialized SMS message to one or more third parties, who may forward the message onto to other parties, and so on. The content provider offering the specialized SMS messages thus misses out on potential revenue as only the original sender had to pay for the specialized SMS message.

Similar problems exist for email messages. The recipient of an email message may forward the email message to one or more third parties without permission from the sender of the email message. Email blocking mechanisms do exist that allow a recipient to block emails from certain senders, but the sender of an email message does not presently have the ability to control whether the recipient of the email message is permitted to subsequently forward the email message to other parties.

SUMMARY OF THE SOLUTION

The invention solves the above and other problems by providing systems and methods that control whether a recipient of an electronic message (e.g., a text message, a multimedia message, an email message, etc) is allowed to forward the electronic message to third parties. The systems and methods described herein provide many advantages. For instance, content providers and message creators that offer specialized text messages or specialized multimedia messages for sale may prevent the recipient of the specialized text/multimedia message from forwarding the message on to third parties. The recipient would have to purchase the specialized text/multimedia message in order to send the message to the third parties, which increases revenues for the content providers and message creators. Also, a sender of a text message, multimedia message, email message, etc, may prevent the recipient from forwarding private or personal messages to third parties.

One embodiment of the invention comprises a method of transmitting electronic messages. One step of the method includes allowing a sender of an electronic message to create the electronic message or select the electronic message from a content server. Another step of the method includes inserting or otherwise including a forwarding control indicator in the electronic message. The forwarding control indicator comprises any bit sequence, flag, or other indicator as to whether this electronic message is allowed to be forwarded by one or more subsequent recipients. Another step of the method includes transmitting the electronic message with the forwarding control indicator to a message center for subsequent transmission to a recipient or recipients. This method may be performed at the access device of the sender, at a content server offering the electronic messages, or at another intermediate server responsible for transmission of the electronic message to the recipient.

Another embodiment of the invention comprises a method of controlling the forwarding of the electronic message by the recipient. One step of the method includes processing the forwarding control indicator in the electronic message to determine if the electronic message is allowed to be forwarded. If a determination is made that the electronic message is not allowed to be forwarded to the third party, then another step includes preventing the electronic message from being forwarded. If a determination is made that the electronic message is allowed to be forwarded to the third party, then another step includes allowing the electronic message to be forwarded. This method may be performed at the access device of the recipient, at the message center, or at another intermediate server between the access device of the recipient and the third party.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
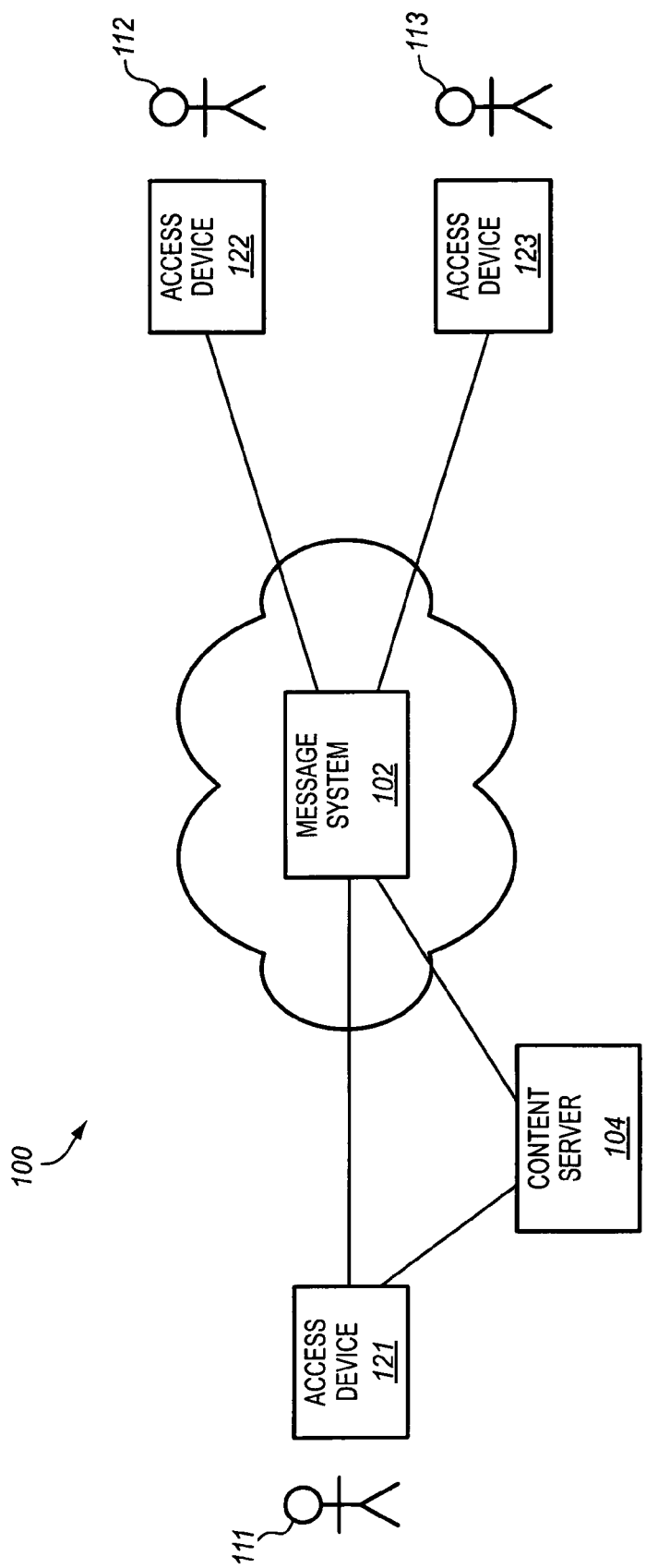
FIG. 1 illustrates a communication network in an exemplary embodiment of the invention.

FIG. 1 illustrates a communication network 100 in an exemplary embodiment of the invention. Communication network 100 may represent a wireline network, an IP Multimedia Subsystem (IMS) network, a packet-based network (IP network), or a wireless network. Communication network 100 is illustrated as including a message system 102, a sender 111 operating an access device 121, a recipient 112 operating an access device 122, and a third party 113 operating an access device 123. Access devices 121-123 each comprise an appropriately-enabled device to send and receive electronic messages through message system 102. Access devices 121-123 may comprise a wireline phone, a wireless (mobile) phone, a PDA, a PC, a VoIP phone, a SIP phone, or any other type of access device. Also illustrated is a content server 104 connected to message system 102 and accessible by access device 121. There may be many intermediate systems, servers, networks, etc, between access devices 121-123 and message system 102 that are not shown for the sake of brevity.

Message system 102 comprises any device, server, or other system adapted to exchange electronic messages between access devices 121-123. An electronic message comprises any type of message exchanged through electronically-mediated communication. An electronic message may comprise a text message (e.g., an SMS message), a multimedia message (e.g., an MMS message), an email message, or another type of message. Message system 102 may take on different forms depending on the type of electronic message being transmitted. For instance, if the electronic message comprises an SMS message, then message system 102 comprises an SMSC that is adapted to receive SMS messages, determine the current status of the recipient 112, and then forward the SMS message to the recipient 112 or store the SMS message for later transmission. If the electronic message comprises an MMS message, then message system 102 comprises an MMSC that is adapted to receive MMS messages, determine the current status of the recipient 112, and then forward the MMS message to the recipient 112 or store the MMS message for later transmission. If the electronic message comprises an email message, then message system 102 comprises an email server, such as an SMTP and/or a POP3 server, that is adapted to control the distribution and storage of email messages.

Content server 104 comprises any server adapted to store specialized electronic messages that are available to sender 111 for free or for a fee. As described in the Background, there are many professional and non-professional message creators that generate specialized electronic messages that a content provider posts on a content server, such as content server 104. The specialized electronic messages are offered to consumers such as sender 111 through a web site or other means.

Assume for illustrative purposes that communication network 100 is operating in a conventional manner. Sender 111 may operate access device 121 to transmit an electronic message to recipient 112 through message system 102. Recipient 112 receives the electronic message through access device 122. Presently, recipient 112 may forward the electronic message to third party 113 through message system 102 without limitation.

Figure 2:
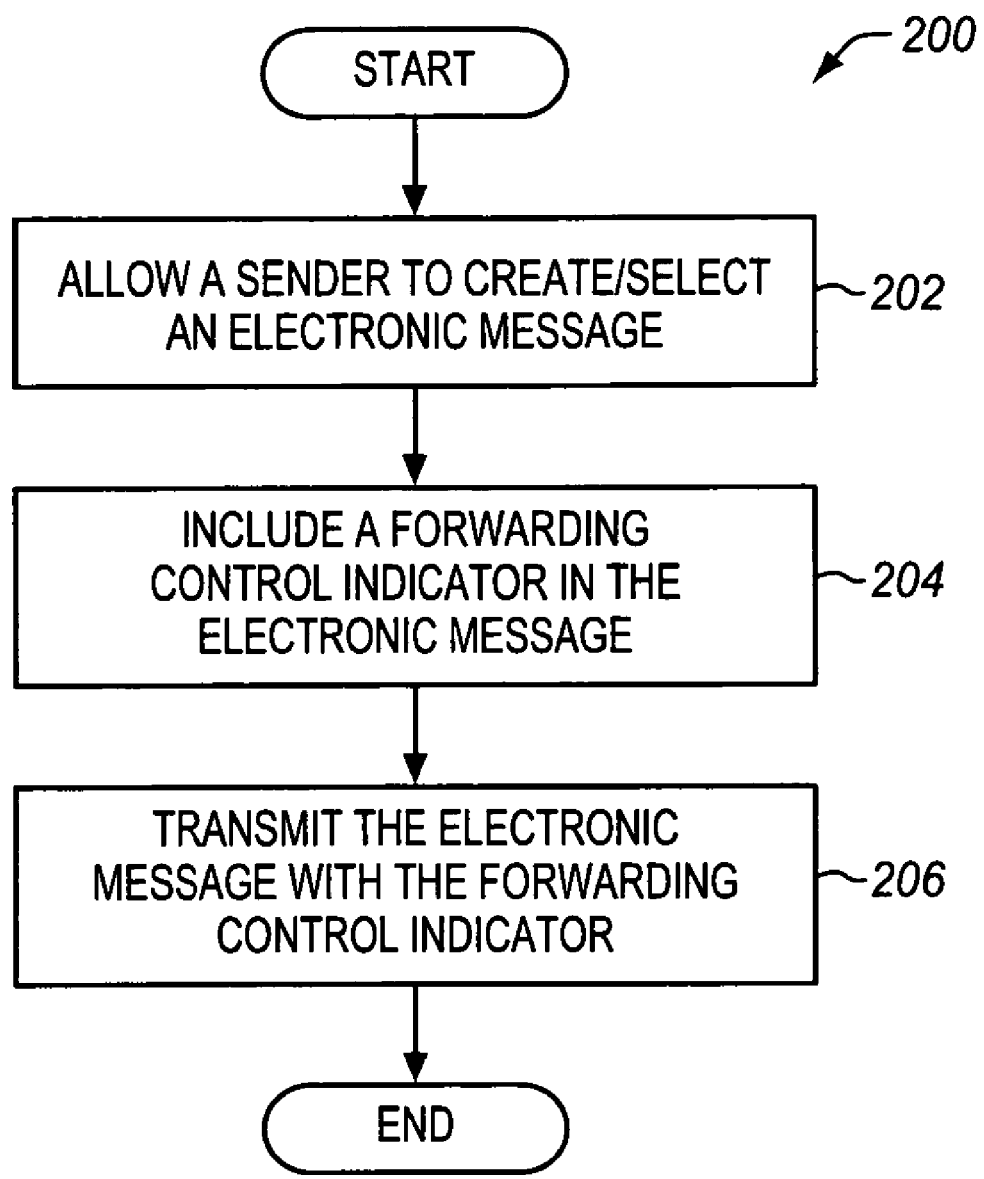
FIG. 2 is a flow chart illustrating a method of transmitting an electronic message in an exemplary embodiment of the invention.

According to features and aspects herein, communication network 100 is adapted to control whether recipient 112 is allowed to forward the electronic message to third party 113 if desired by sender 111 or another party. Assume again that sender 111 wants to transmit an electronic message to recipient 112. FIG. 2 is a flow chart illustrating a method 200 of transmitting the electronic message in an exemplary embodiment of the invention. The steps of method 200 will be described with reference to communication network 100 in FIG. 1. The steps of the flow chart in FIG. 2 are not all inclusive and may include other steps not shown.

In step 202, access device 121 allows sender 111 to create or select an electronic message. For instance, access device 121 may provide a message editor screen that allows the user to create an electronic message. Access device 121 may alternatively access content server 104 that provides a plurality of specialized electronic messages that were previously created. Access device 121 may allow sender 111 to select one of the specialized electronic messages from content server 104, and download the selected electronic message.

In step 204, access device 121 includes a forwarding control indicator in the electronic message. The forwarding control indicator indicates to subsequent systems or devices whether the electronic message is allowed to be forwarded by one or more subsequent recipients of the electronic message. For instance, the forwarding control indicator may indicate that the electronic message cannot be forwarded at all, may be forwarded once, may be forwarded twice, etc. The forwarding control indicator may comprise a bit sequence, a flag, or another type of indicator. The forwarding control indicator may be included in the header of the electronic message, such as in a header field designated for forwarding control.

Access device 121 may query sender 111 as to whether sender 111 wants to prevent forwarding of the electronic message by recipient 112. If sender 111 responds affirmatively, then access device 121 includes the forwarding control indicator in the electronic message. Alternatively, access device 121 may automatically include a forwarding control indicator in this electronic message and other electronic messages, such as through a global setting specified by sender 111.

In step 206, access device 121 transmits the electronic message with the forwarding control indicator to message system 102. Message system 102 subsequently forwards the electronic message with the forward control indicator to access device 122 of recipient 112.

In another alternative embodiment, method 200 may be performed by content server 104. Sender 111 may access content server 104 through access device 121 to view the specialized electronic messages being provided by content server 104. Content server 104 allows sender 111 to select one of the electronic messages, such as through a web site listing the available electronic messages. Content server 104 then includes a forwarding control indicator in the selected electronic message, and transmits the electronic message with the forwarding control indicator to message system 102. Content server 104 may automatically include the forwarding control indicator in the electronic message, particularly when the sender 111 paid for the electronic message.

Method 200 may be performed by a software product comprising an application stored on a storage media. The application may comprise instructions executable by a processing system resident on access device 121, content server 104, or another system to operate as described above. Some examples of instructions are software, program code, and firmware. The instructions are operational when executed by the processing system to direct the processing system to operate in accordance with the invention. The term "processing system" refers to a single processing device or a group of inter-operational processing devices. Some examples of processors are computers, integrated circuits, and logic circuitry.

In FIG. 1, assume at this point that access device 122 of recipient 112 receives the electronic message from sender 111. Also assume that recipient 112 attempts to forward the electronic message to third party 113 through message system 102. According to features and aspects herein, recipient 112 may not be permitted to forward the electronic message as described below.

Figure 3:
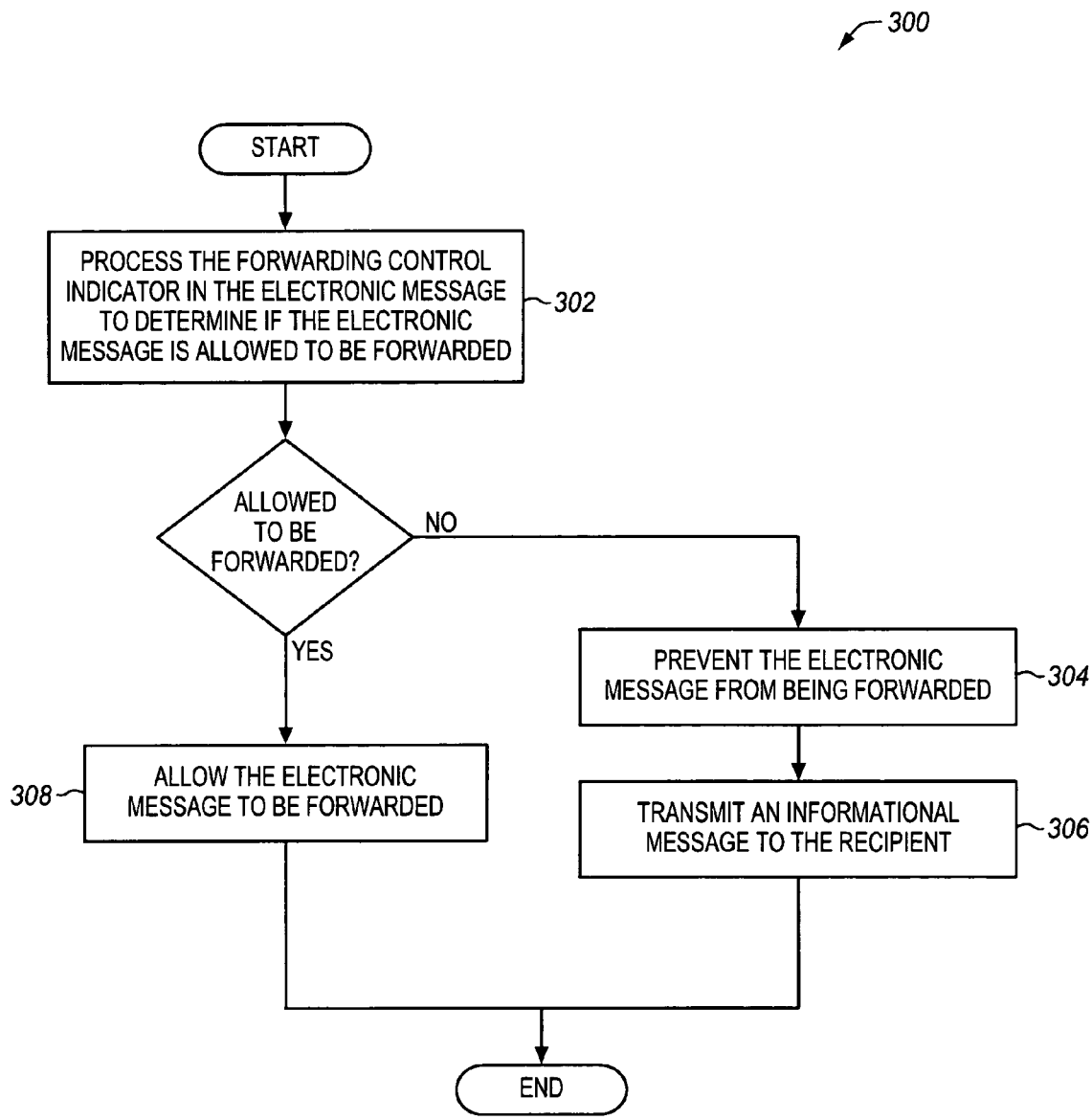
FIG. 3 is a flow chart illustrating a method of controlling the forwarding of the electronic message by the recipient in an exemplary embodiment of the invention.

FIG. 3 is a flow chart illustrating a method 300 of controlling the forwarding of the electronic message by the recipient 112 in an exemplary embodiment of the invention. The steps of method 300 will be described with reference to communication network 100 in FIG. 1. The steps of the flow chart in FIG. 3 are not all inclusive and may include other steps not shown. Method 300 may be performed by an application running on access device 122 of recipient 112 responsive to recipient 112 attempting to forward the electronic message. Alternatively, method 300 may be performed by an application running on message system 102 or another intermediate server responsive to receiving the electronic message being forwarded by access device 122 of recipient 112.

Step 302 of method 300 includes processing the forwarding control indicator in the electronic message to determine if the electronic message is allowed to be forwarded. If the forwarding control indicator is included in the message header, the forwarding control indicator is first identified in the message header and then processed to determine if the electronic message is allowed to be forwarded.

If a determination is made that the electronic message is not allowed to be forwarded, then step 304 of method 300 includes preventing the electronic message from being forwarded to the third party 113. Preventing the electronic message from being forwarded to the third party 113 may include blocking the electronic message at access device 122, blocking the electronic message at message system 102, or blocking the electronic message at another intermediate server according to one or more desired blocking schemes. If the electronic message is prevented from being forwarded, then method 300 may further include step 306 of transmitting an informational message to the recipient 112 indicating that the electronic message has been prevented from being forwarded to third party 113.

If a determination is made that the electronic message is allowed to be forwarded, then step 308 of method 300 includes allowing the electronic message to be forwarded to third party 113. If method 300 is performed at access device 122, then access device 122 would forward the electronic message to message system 102 in step 308. If message system 102 is properly equipped, message system 102 may perform method 300 a second time responsive to receiving the forwarded electronic message. If method 300 is performed at message system 102, then message system 102 would forward the electronic message to access device 123 of third party 113 in step 308.

Method 300 may be performed by a software product comprising an application stored on a storage media. The application may comprise instructions executable by a processing system resident on access device 122, message system 102, or another system to operate as described above.

Figure 4:
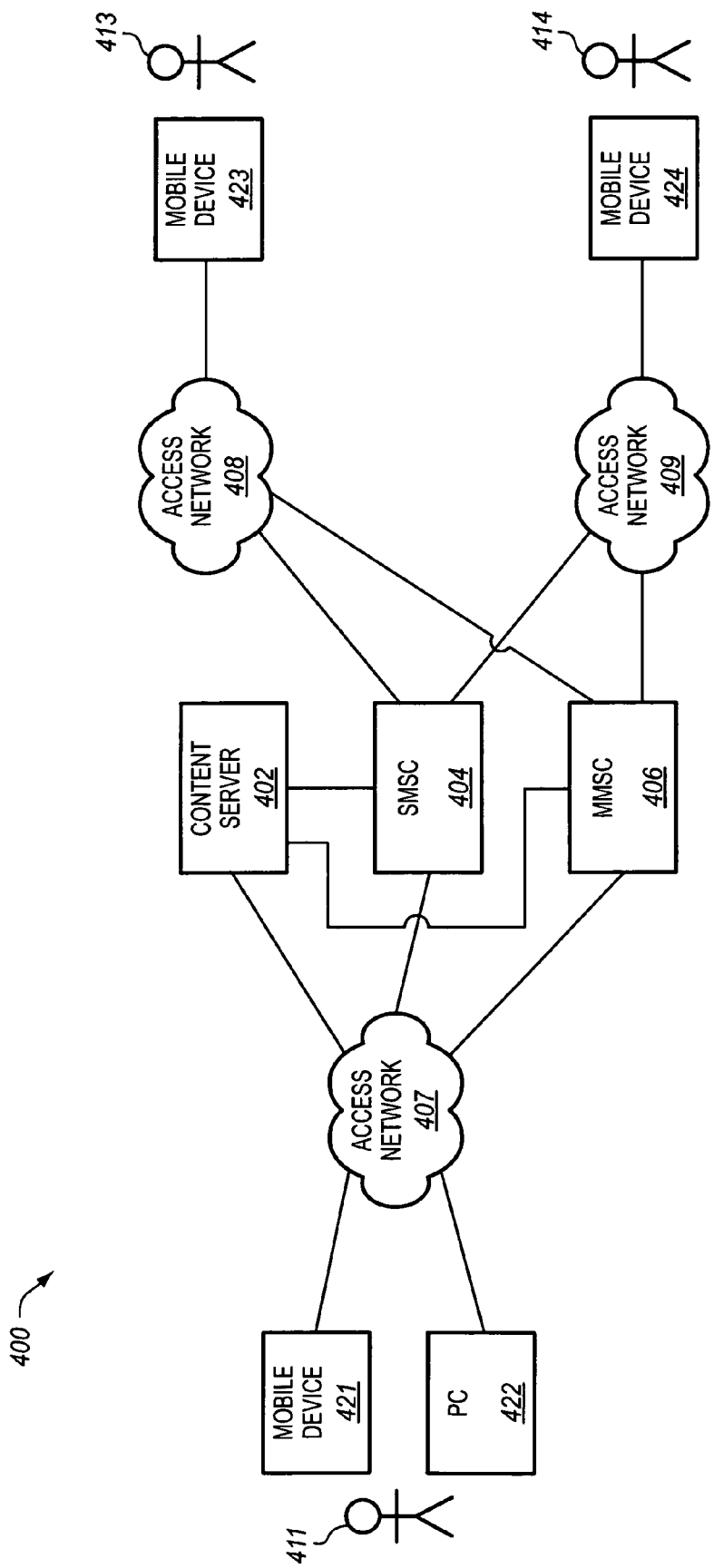
FIG. 4 illustrates another communication network that provides text messaging and multimedia messaging in an exemplary embodiment of the invention.

FIG. 4 illustrates another communication network 400 that provides text messaging and multimedia messaging in an exemplary embodiment of the invention. Communication network 400 is illustrated as including a content server 402 adapted to store specialized SMS or MMS messages, an SMSC 404, and an MMSC 406. Communication network 400 is further illustrated as including a sender 411 operating a mobile device 421 and a PC 422. Mobile device 421 and PC 422 are each connected to content server 402, SMSC 404, and MMSC 406 over an access network 407. Communication network 400 is further illustrated as including a recipient 413 operating a mobile device 423 that is connected to SMSC 404 and MMSC 406 over an access network 408. Communication network 400 is further illustrated as including a third party 414 operating a mobile device 424 that is connected to SMSC 404 and MMSC 406 over an access network 409. Access networks 407-409 may comprise SS7 networks, IP networks, or other types of networks.

Assume for one embodiment that sender 411 wants to transmit an SMS message to recipient 413. To send the SMS message, sender 411 accesses content server 402 through PC 422 (or mobile device 421) over access network 407. Content server 402 provides a web site offering a plurality of specialized SMS messages that are available for purchase. Sender 411 browses the specialized SMS messages and purchases one of the SMS messages to transmit to recipient 413. Content server 402 completes the transactions for the purchase of the SMS message, such as receiving payment from sender 411 by credit card, prepaid, etc.

According to features and aspects herein, before transmitting the SMS message to recipient 413, content server 402 includes a forwarding control indicator in the SMS message. As an example, content server 402 may set forwarding control bits in the header of the SMS message. Once the forwarding control bits are set, the SMS message is forwarding restricted. Content server 402 then transmits an SMS delivery request to SMSC 404 via SMPP protocol with the message body and the header. SMSC 404 then transmits the SMS message to the mobile device 423 of recipient 413 over access network 408. SMSC 404 may transmit the SMS message through MAP protocol if access network 408 comprises an SS7 network, or may transmit the SMS message though SMPP protocol if access network 408 comprises an IP network.

Mobile device 423 of recipient 413 receives the SMS message from SMSC 404. Assume that recipient 413 attempts to forward the SMS message to third party 414. Before forwarding the SMS message to SMSC 404, mobile device 423 may execute an application to process the forwarding control bits in the header of the SMS message to determine if the SMS message is allowed to be forwarded. If a determination is made that the SMS message is not allowed to be forwarded to third party 414, as is the case in this embodiment, then mobile device 423 prevents the SMS message from being forwarded to third party 414.

If mobile device 423 is not enabled with the application, then mobile device 423 forwards the SMS message to SMSC 404 over access network 408. SMSC 404 then executes an application to process the forwarding control bits in the header of the SMS message to determine if the SMS message is allowed to be forwarded. If a determination is made that the SMS message is not allowed to be forwarded to third party 414, then SMSC 404 prevents the SMS message from being forwarded to third party 414.

If the SMS message is prevented from being forwarded by either mobile device 423 or SMSC 404, then an informational message may be transmitted to the recipient 413 indicating that the electronic message has been prevented from being forwarded to the third party 414.

Assume again for another embodiment that sender 411 wants to transmit an SMS message to recipient 413. Instead of selecting a specialized SMS message from content server 402, sender 411 creates a custom SMS message through mobile device 421 (or PC 422). According to features and aspects herein, before transmitting the SMS message to recipient 413, mobile device 421 includes a forwarding control indicator in the SMS message. As an example, mobile device 421 may set forwarding control bits in the header of the SMS message. Mobile device 421 may query sender 411 as to whether sender 411 wants the SMS message to be prevented from being forwarded. If the sender 411 responds affirmatively, then mobile device 421 sets the forwarding control bits accordingly. Alternatively, mobile device 421 may automatically set the forwarding control bits to prevent forwarding of the SMS message, such as through a global setting specified by sender 411.

Once the forwarding control bits are set, the SMS message is forwarding restricted. Mobile device 411 then transmits an SMS delivery request to SMSC 404 with the message body and the header over access network 407. SMSC 404 then transmits the SMS message to the mobile device 423 of recipient 413 over access network 408. Recipient 413 is thus prevented from forwarding the message as described in the previous embodiment based on the setting of the forwarding control bits in the SMS message.

MMS messages may be forwarding restricted in a similar manner as described for SMS messages.

The forwarding control bits as described above may be added as an extension to the standard MAP MO/MT message format. MAP-MO-FORWARD-SHORT-MESSAGE service is a service used between the serving MSC or the SGSN and the gateway MSC to forward mobile-originated short messages. MAP-MT-FORWARD-SHORT-MESSAGE service is a service used between the gateway MSC and the serving MSC or the SGSN to forward mobile-terminated short messages. Those skilled in the art will recognize how serving MSCs, SGSNs and gateway MSCs fit into access networks 407-409.

A new field, referred to herein as the SM_Forward_Restricted field, may be added to the MAP-MO-Forward-SMS message. The SM_Forward_Restricted field represents the forwarding restriction field sent by mobile device 421 or content server 402 in the "message type" field (CP-Data) of a control protocol message or in the "message type indicator" field (RP-Data) of a relay protocol message. The forwarding control bits would be included in the SM_Forward_Restricted field. The forwarding control bits indicate whether or not the SMS message may be forwarded. The forwarding control bits may also indicate whether the SMS message may be forwarded once, twice, etc. For instance, a value of "00" for the forwarding control bits may indicate that the SMS message is not allowed to be forwarded at all. A value of "01" for the forwarding control bits may indicate that the SMS message is allowed to be forwarded one time. A value of "10" for the forwarding control bits may indicate that the SMS message is allowed to be forwarded two times.

The forwarding control bits as described above may also be added as an extension to the standard SMPP message format. Forwarding restriction may be controlled by a "service_type" parameter that is used in SMPP messages, such as "submit_sm", "data_sm", "deliver_sm", "broadcast_sm", "cancel_sm", and "cancel_broadcast_sm". The "service_type" parameter may be used to indicate the SMS Application service associated with the message in SMPP protocol for an IP network-based SMS/MMS. The forwarding control bits may be set as described in the preceding paragraph to control the forwarding of an SMS/MMS message.

Figure 5:
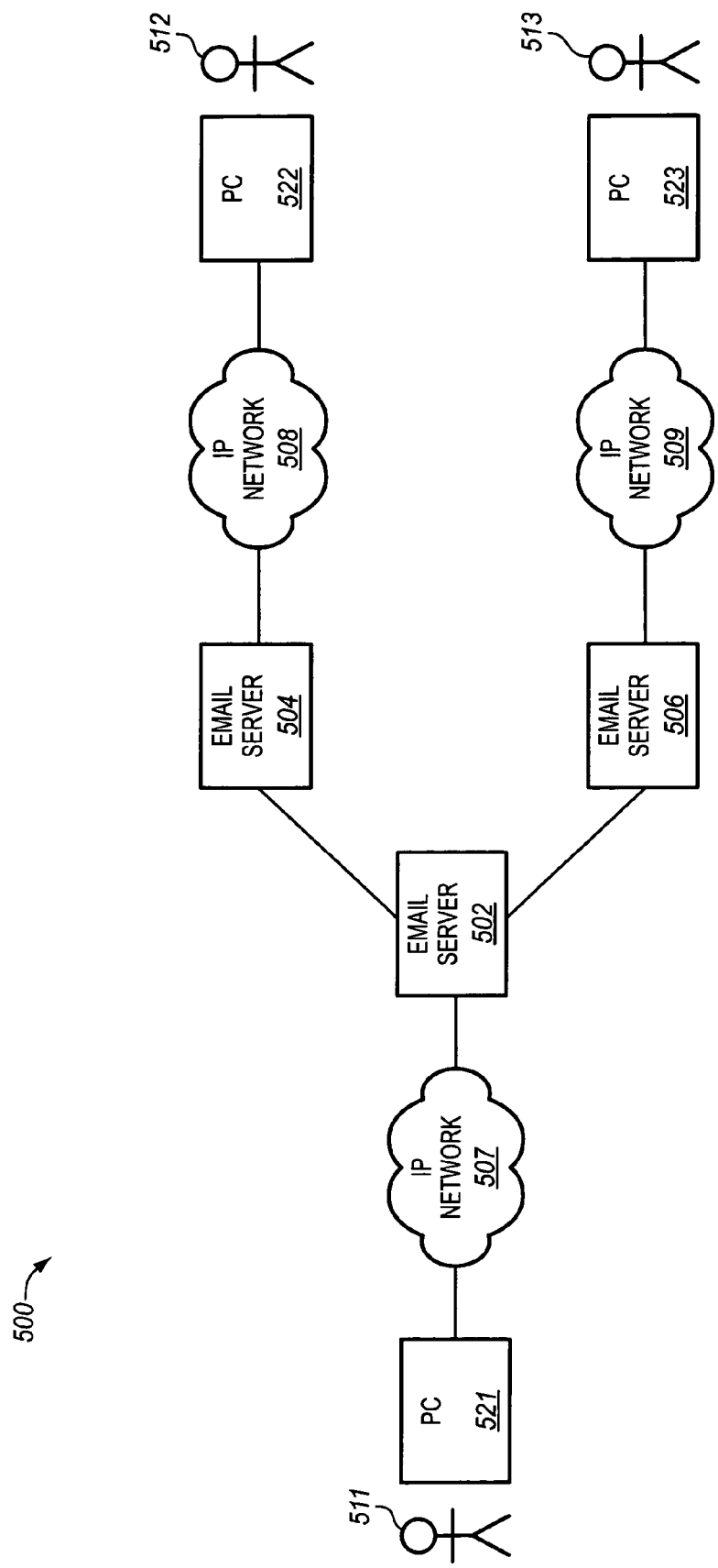
FIG. 5 illustrates another communication network that provides email messaging in an exemplary embodiment of the invention.

FIG. 5 illustrates another communication network 500 that provides email messaging in an exemplary embodiment of the invention. Communication network 500 is illustrated as including a sender 511 operating a PC 521 (or any other device not shown). PC 521 is connected to an email server 502 through an IP network 507. Communication network 500 is further illustrated as including a recipient 512 operating a PC 522 (or any other device not shown). PC 522 is connected to another email server 504 through an IP network 508. Communication network 500 is further illustrated as including a third party 513 operating a PC 523 (or any other device not shown). PC 523 is connected to another email server 506 through an IP network 509. PCs 521-523 may comprise other types of devices that are email-enabled. Email servers 502, 504, and 506 may include SMTP servers, POP3 servers, etc.

Assume that sender 511 wants to transmit an email message to recipient 512. To send the email message, sender 511 creates the email message through an email application running on PC 521. According to features and aspects herein, before transmitting the email message to email server 502, the email application includes a forwarding control indicator in the email message. As an example, the email application may set forwarding control bits in the email header, such as in the SMTP header field. The email application may query sender 511 as to whether sender 511 wants the email message to be prevented from being forwarded. If the sender 511 responds affirmatively, then the email application sets the forwarding control bits accordingly. Alternatively, the email application may automatically set the forwarding control bits to prevent forwarding of the email message and other email messages, such as through a global setting specified by sender 511.

The email application then transmits the email message to email server 502 via SMTP protocol or another protocol over IP network 507. Based on the network address specified in the email header, email server 502 routes the email message to the email server 504 of recipient 512. Email server 504 then stores this and other emails for recipient 512. An email application running on PC 522 then retrieves the email message from email server 504, such as through POP3 or another protocol over IP network 508.

Assume that recipient 512 attempts to forward the email message to third party 513. Before forwarding the email message to email server 504, the email application running on PC 522 processes the forwarding control bits in the email header to determine if the email message is allowed to be forwarded. If a determination is made that the email message is not allowed to be forwarded to third party 513, as is the case in this embodiment, then the email application prevents the email message from being forwarded to third party 513.

If the email application is not enabled to provide forwarding restriction, then the email application forwards the email message to email server 504 over IP network 508. Email server 504 or another email server then executes an application to process the forwarding control bits in the email header to determine if the email message is allowed to be forwarded. If a determination is made that the email message is not allowed to be forwarded to third party 513, then email server 504 prevents the email message from being forwarded to third party 513.

If the email message is prevented from being forwarded by either the email application running on PC 522 or email server 504, then an informational message is transmitted to the recipient 512 indicating that the email message has been prevented from being forwarded to third party 513.

Although specific embodiments were described herein, the scope of the invention is not limited to those specific embodiments. The scope of the invention is defined by the following claims and any equivalents thereof.

We claim:

1. A method of controlling the forwarding of an electronic message, the method comprising:
  receiving the electronic message from a sender in an access device of a recipient;
  if the recipient attempts to forward the electronic message to a third party, then:
    identifying a forwarding control indicator in the electronic message that was set by the sender to specify whether the electronic message is allowed to be forwarded, and processing the forwarding control indicator to determine if the electronic message is allowed to be forwarded, wherein the forwarding control indicator was set by the sender to specify how many times the electronic message is allowed to be forwarded to subsequent recipients;
    preventing the electronic message from being forwarded to the third party responsive to a determination that the electronic message is not allowed to be forwarded to the third party; and
    allowing the electronic message to be forwarded to the third party responsive to a determination that the electronic message is allowed to be forwarded to the third party.

2. The method of claim 1 wherein identifying a forwarding control indicator in the electronic message comprises:
  identifying the forwarding control indicator in a header of the electronic message that is designated for forwarding control.

3. The method of claim 1 wherein:
  the electronic message was purchased by the sender of the electronic message from a content server.

4. The method of claim 1 wherein the electronic message comprises a text message or a multimedia message.

5. The method of claim 1 wherein the electronic message comprises an email message.

6. The method of claim 1 further comprising:
  responsive to the electronic message being prevented from being forwarded to the third party, transmitting an informational message to the recipient indicating that the electronic message has been prevented from being forwarded to the third party.

7. A software product for controlling the forwarding of an electronic message, the software product comprising:
  non-transitory storage media adapted to store instructions; and
  the instructions when executed by a processing system are adapted to control the processing system to:
    receive the electronic message from a sender in an access device of a recipient;
    if the recipient attempts to forward the electronic message to a third party, then:
      identify a forwarding control indicator in the electronic message that was set by the sender to specify whether the electronic message is allowed to be forwarded;
      process the forwarding control indicator to determine if the electronic message is allowed to be forwarded, wherein the forwarding control indicator was set by the sender to specify how many times the electronic message is allowed to be forwarded to subsequent recipients;
      prevent the electronic message from being forwarded to the third party responsive to a determination that the electronic message is not allowed to be forwarded to the third party; and
      allow the electronic message to be forwarded to the third party responsive to a determination that the electronic message is allowed to be forwarded to the third party.

8. The software product of claim 7 wherein the instructions are adapted to control the processing system to:
  identify the forwarding control indicator in a header of the electronic message that is designated for forwarding control.

9. The software product of claim 7 wherein:
  the electronic message was purchased by the sender of the electronic message from a content server.

10. The software product of claim 7 wherein the electronic message comprises a text message or a multimedia message.

11. The software product of claim 7 wherein the electronic message comprises an email message.

12. The software product of claim 7 wherein the instructions are adapted to control the processing system to:
  transmit an informational message to the recipient indicating that the electronic message has been prevented from being forwarded to the third party responsive to the electronic message being prevented from being forwarded to the third party.

13. The software product of claim 7 wherein the instructions are executed by a processing system on an access device being operated by the recipient.

14. The software product of claim 7 wherein the instructions are executed by a processing system on a message system receiving the electronic message after being forwarded by the recipient.

15. A method of controlling the forwarding of an electronic message, the method comprising:
  allowing a sender to create or select an electronic message;
  querying the sender as to whether the sender wants to prevent forwarding of the electronic message by a recipient;
  if the sender responds affirmatively, then:
    including a forwarding control indicator in the electronic message, wherein the forwarding control indicator indicates whether the electronic message is allowed to be forwarded by a recipient of the electronic message, and is set by the sender to specify how many times the electronic message is allowed to be forwarded to subsequent recipients; and transmitting the electronic message with the forwarding control indicator to a message system for subsequent transfer to the recipient.

16. The method of claim 15 wherein including a forwarding control indicator in the electronic message comprises:

inserting the forwarding control indicator in a header of the electronic message that is designated for forwarding control.

17. The method of claim 15 wherein the electronic message comprises one of a text message, a multimedia message, or an email message.

* * * * *